United States Patent [19]
Ohishi

[11] 3,757,721
[45] Sept. 11, 1973

[54] UNDERWATER CRAFT FOR TRANSPORTING DIVERS

[76] Inventor: Yasuhiro Ohishi, 26-34, 5-chome, Nakano, Nakano-ku, Tokyo, Japan

[22] Filed: Feb. 23, 1972

[21] Appl. No.: 228,578

[30] Foreign Application Priority Data
Feb. 24, 1971 Japan.............................. 46/11025
Mar. 25, 1971 Japan.............................. 46/20413
Mar. 25, 1971 Japan.............................. 46/20414
Dec. 1, 1971 Japan.............................. 46/113069

[52] U.S. Cl.............................................. 114/16 A
[51] Int. Cl.............................................. B63g 8/00
[58] Field of Search................................. 114/16 A

[56] References Cited
UNITED STATES PATENTS
2,918,889   12/1959   Rebikoff......................... 114/16 A
3,650,234   3/1972   Goudy............................ 114/16 A

FOREIGN PATENTS OR APPLICATIONS
292,570   12/1964   Australia......................... 114/16 A

*Primary Examiner*—Milton Buchler
*Assistant Examiner*—Stuart M. Goldstein
*Attorney*—Eric H. Waters, John G. Schwartz et al.

[57] ABSTRACT

An underwater craft or scooter adapted to transport a diver underwater and having a hull, a screw for propulsion of the hull, an electric motor for driving the screw through a propeller shaft, a storage battery for supplying power to the motor, and a control system for controlling the supply of power. Various improvements are provided, among which is a transparent water shield for shielding the operator from the relative flow of water past the hull in motion, a trimming device for fore-and-aft balancing of the hull, a device for reducing moisture in the hull, a system for detecting and indicating water in the hull, apparatus for protecting electrical parts from moisture and battery gases, a system for discharging battery gases out of the hull, a device for preventing infiltration of battery gases to and into electrical parts, and a device for preventing leakage of battery electrolyte to parts surrounding the battery.

18 Claims, 41 Drawing Figures

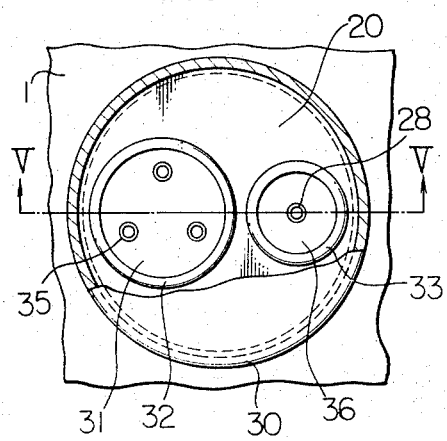
FIG. 4
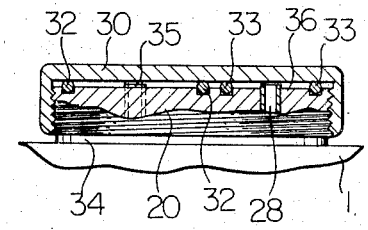
FIG. 5
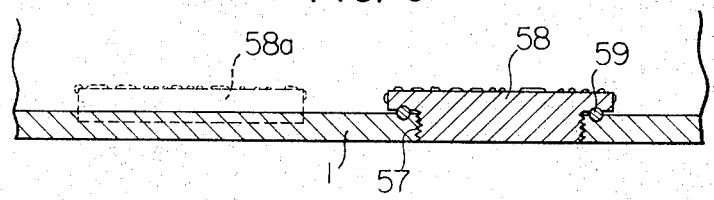
FIG. 6
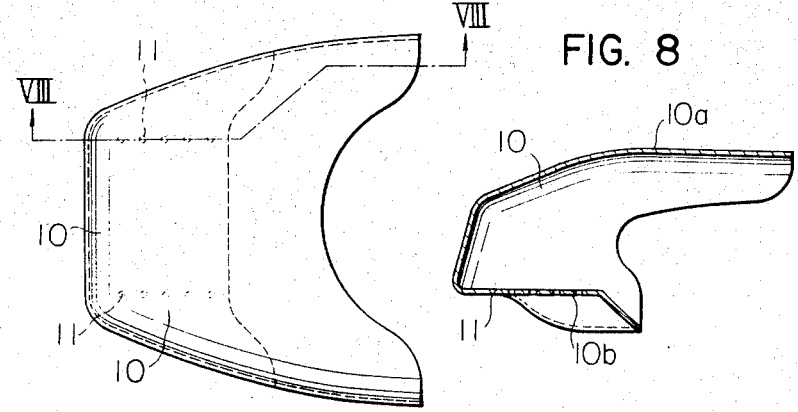
FIG. 7
FIG. 8

FIG. 38(a)
FIG. 38(b)
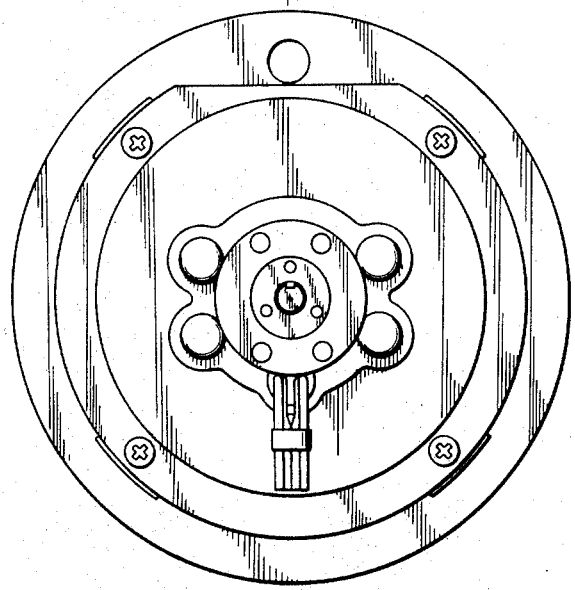
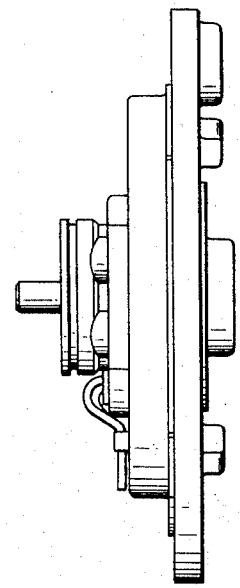
FIG. 39
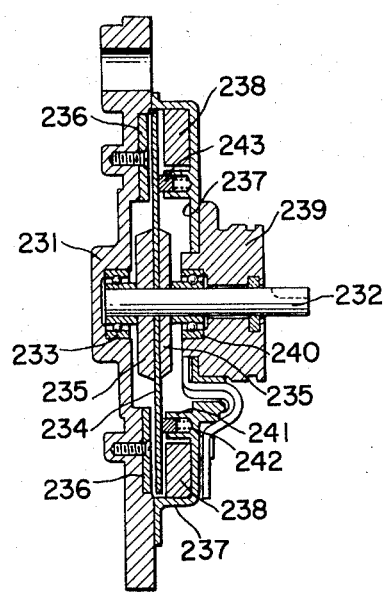

3,757,721

UNDERWATER CRAFT FOR TRANSPORTING DIVERS

BACKGROUND OF THE INVENTION

This invention relates generally to submarine or underwater crafts, machines, and devices and more particularly to a new and advanced underwater craft of a type which may be called an "underwater scooter," and which can be used to carry or tow one or more underwater divers.

The design of an underwater craft of this character is much more difficult than one would at first conclude and requires the solution of several difficult problems.

One of the principal problems is the presence of water within the enclosed parts of the craft which accommodate the motive power means, the electrical system, and related parts. One source of this water is water condensed by the difference between the original temperature of the air with the enclosed parts and the temperature of the underwater environment. While the quantity of this water is not large, this water is troublesome in that it can reach all exposed interior parts of the craft. Another source of water is water which infiltrates from the underwater environment into the craft interior and accumulates therewithin as bilge water. Any water or moisture within the craft is undesirable because it causes short-circuiting of the electrical system and corrosion of metal parts.

A related problem is leakage of water into the craft through parts such as the hull part where the shaft of the screw propeller extends out of the hull.

Another difficult problem is the generation of gases from the electric storage battery. In the present state of the art, a battery of the type containing an electrolyte is the most practical source of power for propulsion, illumination, and other purposes in an underwater craft of the instant character, and the generation of gases from the battery. These gases must be effectively exhausted out of the craft, and the electrical system must be shielded from these gases in order to prevent ignition thereof and the consequent explosion.

Still another problem, related to the problem of battery gas generation, is the leakage of the electrolyte from the storage battery.

Still another problem is the necessity of a switching device for initially connecting several of the battery cells in series with the main motor and connecting several of the cells in parallel with the motor when the voltage decreases or when lowering the speed. Such a switching procedure is necessary for efficient utilization of the energy stored in the battery.

A further problem is the tendency of a craft of this character to lose its fore-and-aft balance when it is carrying or towing a diver. In addition, direct exposure of the diver to the flow of water relative to the moving craft gives rise to fatigue and discomfort.

Some of these problems will be described more fully hereinafter in connection with the solutions thereto afforded by this invention.

SUMMARY OF THE INVENTION

It is an object of this invention to provide a practical underwater scotter of the above indicated type wherein the above stated problems are substantially overcome.

According to this invention, briefly summarized, there is provided an underwater craft adapted to transport one or more divers underwater and comprising a hull, a screw for propulsion of the null, an electric motor for driving the screw through a propeller shaft, a storage battery for supplying power to the motor, a control system for controlling the supply of power, a handlebar secured to the hull for grasping by at least one diver, a transparent water shield mounted on the hull for shielding the diver from the relative water flow past the hull in motion, a trimming device for diverting the relative water flow thereby to trim the hull in pitch to overcome unbalance due to the weight of the diver bearing on the hull, means for minimizing leakage of outside water into the hull, means for reducing condensation of moisture in the hull, means for protecting electrical parts within the hull from moisture and gases, means for detecting and indicating water in the hull, means for discharging battery gases out of the hull, means for preventing infiltration of battery gases to and into electrical parts, and means for preventing leakage of battery electrolyte out to parts surrounding the battery.

The nature, utility, and further features of this invention will be apparent from the following detailed description with respect to preferred embodiments of the invention when read in conjunction with the accompanying drawings, in which like parts are designated by like reference numerals.

BRIEF DESCRIPTION OF THE DRAWINGS

In the drawings:

FIG. 4 is a relatively enlarged, fragmentary plan view showing an access device for battery charging and exhausting of battery gases;

FIG. 5 is a vertical section taken along the plane indicated by line V—V in FIG. 4 as viewed in the arrow direction;

FIG. 6 is an enlarged, fragmentary view, in vertical section, showing the details of a device for discharging heat within the scooter hull to the underwater environment;

FIG. 7 is a plan view showing a transparent waterflow shiled provided around the piloting area of the sooter;

FIG. 8 is a vertical section taken along the planes indicated by bent line VIII—VIII in FIG. 7 as viewed in the arrow direction;

FIGS. 38($a$) and 38($b$) are respectively an axial elevation and a side elevation showing the exterior of a printed-coil motor according to this invention;

FIG. 39 is a vertical section taken along the plane indicated by line XXXIX — XXXIX in FIG. 38($a$) as viewed in the arrow direction.

DETAILED DESCRIPTION

Figure 1:
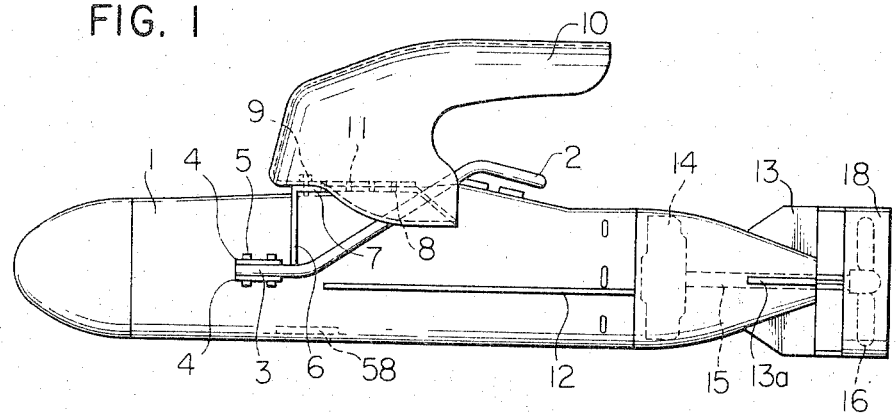
FIG. 1 is a side (port) elevation showing the general exterior of an example of an underwater scooter according to this invention.
Figure 2:
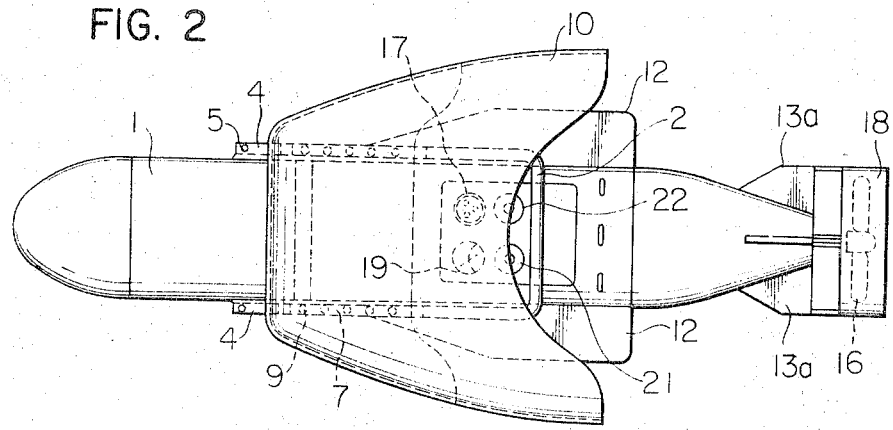
FIG. 2 is a plan view of the general exterior of the underwater scooter shown in FIG. 1.

The exterior appearance of one example of an underwater scooter embodying this invention is shown in FIGS. 1 and 2. The main body or structure of this scooter is a torpedo-like hull 1 having a bow or forward end on the left and a stern or aft end on the right as viewed in FIGS. 1 and 2.

The hull 1 is provided at its stern with vertical and horizontal tail fins 13 and 13a, a propulsion screw 16 disposed aft of the tail fins, and a screw ring or cowling 18 disposed around the screw to prevent objects, including divers, from contacting the screw. The hull 1 is provided further at its upper midship part with a handlebar 2, a water shield 10, switches 21 and 22, a socket 17 for recharging of the battery, and a meter 19 for indicating the over-discharged state of the battery.

Figure 3:
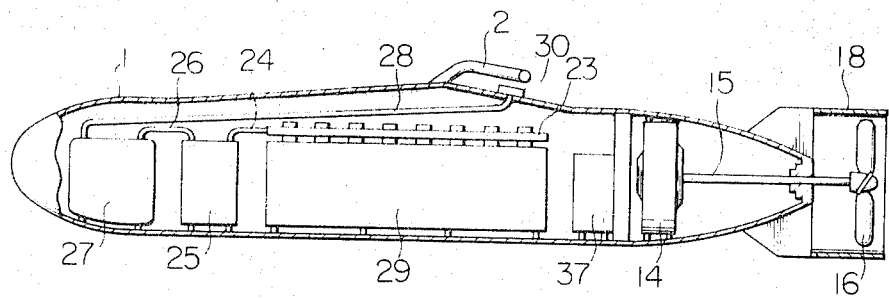
FIG. 3 is a side (port) elevation, with parts cut away, showing the principal internal parts and arrangement thereof within the hull of the same underwater scooter.

The hull 1 contains therewithin a motor 14 for driving the screw 16 through a propeller shaft 15, a storage battery 29 (as shown in FIG. 3) for supplying power to the motor 14 and other devices, an accumulating tank 25, a sealed inflatable container 27, and a device 37 for discharging water which has infiltrated into the hull, all described more fully hereinafter.

In accordance with this invention, in one of its aspects, there is provided a water shield 10, as mentioned briefly hereinabobe, whereby when the operator or diver grasps the handlebar 2 to operate the scooter in submerged state, he can travel underwater in comfort without being subjected to the full force of the water flow relative to the scooter.

The scooter hull 1 of torpedo-like shape is made of a hard synthetic resin or some other suitable material or materials. The handlebar 2 is U-shaped as viewed in plan, and its free ends 3, 3, which are directed forward, are secured by fastening means 5, 5 to projecting brackets 4, 4 respectively fixed to the starboard and port sides of the hull. The lower ends of starboard and port support members 6, 6 are secured to the free ends 3, 3 of the handlebar immediately aft of the projecting brackets 4, 4. The upper parts of these support members 6, 6 are bent horizontally toward the stern to form mounting parts 7, 7, which are provided therealong with a plurality of through holes 8 for adjustment.

The water shield 10, as best shown in FIGS.7 and 8, is made of a transparent material and has a roof part 10a and a bottom part 10b. The bottom part 10b is provided with two rows of through holes 11 adapted to align with the holes 8 in the mounting parts 7, 7. Thus the water shield 10 can be mounted in a manner permitting free forward-and-off movement and adjustment by fastening means 9 passed through the through holes 8 and 11.

On the upper part of the hull 1, forward of the handlebar 2, there is provided a flat part constituting a "dashboard," on which are provided the receptacle or socket 17 for insertion of a pronged plug of an electric cord when the battery 29 is to be recharged, a battery gas discharge outlet (not shown) which can be covered together with the socket 17 by one cover member, the meter 19 for indicating the discharged state of the buttery, switches 21 and 22, and other devices such as an ultrasonic transceiver (not shown).

By the above described arrangement of parts and devices, the resistive force of the water during underwater operation is borne by the water shield 10 mounted with freedom to move forward-and-aft on the support members 6, 6. Accordingly, the operator or diver (not shown) holding onto the handlebar 2 is not subjected directly to this water force and is therefore able to operate the underwater scooter, particularly the various controls such as the switches 21 and 22, in an accurate and errorless manner.

Furthermore, the fore-and-aft mounting position of the water shield 10 can be adjusted to suit the operator by unfastening the mounting fasteners 9, changing the relative positions of the matching through holes 8 and 11, and refastening the mounting fasteners 9.

Thus, the operator can maintain his head within the water shield 10, whereby he can view the switches 21 and 22, the meter 19, and other instruments as well as the space forward of the scooter without discomfort or disturbance by direct contact with flotsam and sea weeds. Accordingly, the operator can operate the scooter with ease and comfort while avoiding dangers such as collision and descending to excessive depths.

When the operator grasps the handlebar 2 and assumes his riding position astern thereof, his weight bears down upon the rear end of the scooter, and the fore-and-aft balance of the scooter is thereby disturbed. Consequently, the bow of the scooter rises, and the scooter tends to surface and plane along the water surface. This undesirable result is prevented in accordance with this invention by providing a trimming device at the stern end of the scooter.

Figure 9:
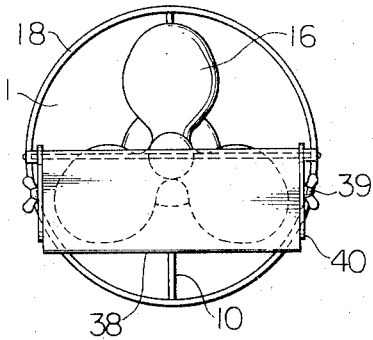
FIG. 9 is a stern elevation of the scooter, showing one example of a stern hydroplane for fore-and-aft trimming of the underwater scooter.
Figure 10:
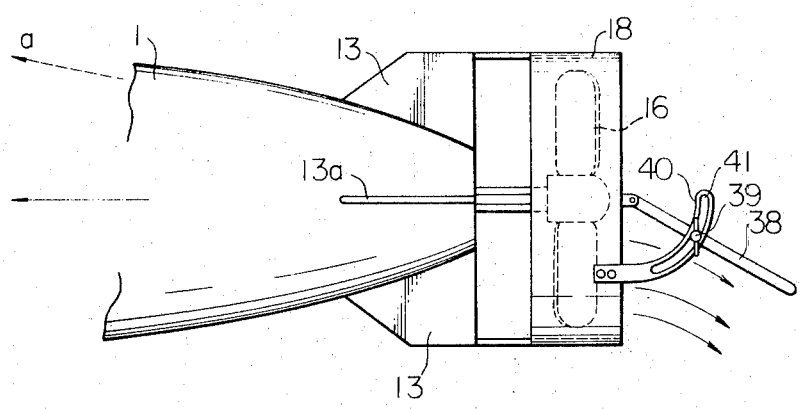
FIG. 10 is a side (port) elevation, orthogonal to FIG. 9, showing the stern end of the scooter and the stern hydroplane.

In one example of this trimming device as illustrated in FIGS. 9 and 10, a trimming hydroplane 38 is hinged at its horizontal leading edge to the aft end of the screw ring 18 and is thereby pivotable about the hinge to vary its angle of attack or trim angle. This hydroplane 38 is provided at its lateral ends, at positions removed from the hinge line, with holding devices such as combinations each of a threaded pin 39 and a wing nut engaged therewith. Each pin 39, which is fixed at one end to the lateral end of the hydroplane and extends laterally outward, is slidably engaged in an arcuate guide slot 41 in a respective guide member 40 fixed to the hull 1 or the ring 18.

By the above described arrangement, a suitable trim angle can be selected and the hydroplane set at that angle simply by tightening the two wing nuts. The hydroplane thereupon functions as a waterfoil to lift the stern of the underwater scooter and thereby to counter the tendency of the scooter to assume a pitch orientation as indicated by arrow $a$.

Figure 11:
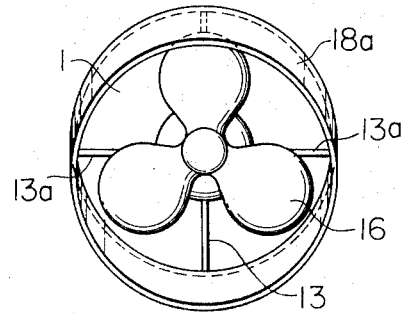
FIG. 11 is a stern elevation of the scooter, showing a deflecting ring or cowling disposed around the propulsion screw of the scooter and constituting another example of a trimming device.
Figure 12:
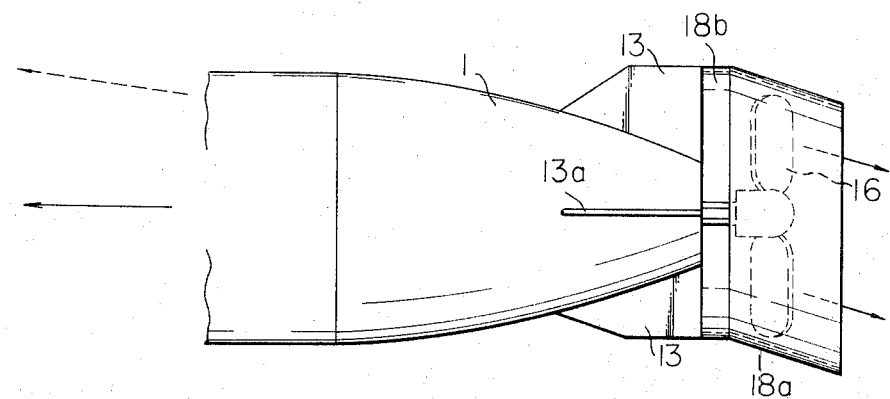
FIG. 12 is a side (port) elevation, orthogonal to FIG. 11, showing the stern end of the scooter and the deflecting ring.

In another example of the trimming device as illustrated in FIGS. 11 and 12, a downwardly deflected screw ring is used. This ring has a leading-edge part 18$b$, which has the shape of a right-circular cylinder for mounting the ring on the trailing edges of the tail fins 13 and 13$a$, and a downwardly deflected main part 18$a$ contiguously aft of the part 18$b$. This ring functions similarly as the trimming hydroplane 38 of the preceding example in maintaining the fore-and-aft trim balance of the underwater scooter when it is being operated underwater by a diver.

According to this invention in another aspect thereof, there is provided a novel bearing device for the propeller shaft, which bearing device is highly efficient as a bearing and, at the same time, is highly waterproof.

Figure 13:
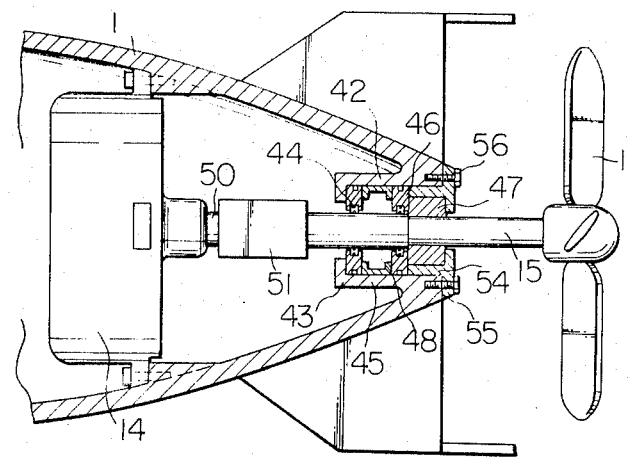
FIG. 13 is a relatively enlarged side (port) elevation, partly in vertical section, showing an example of a bearing and packing device for the screw shaft.
Figure 14:
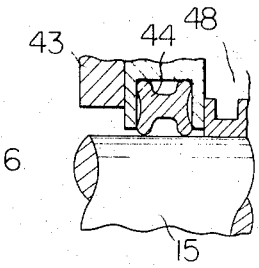
FIG. 14 is a further enlarged, fragmentary side view, partly in longitudinal section showing a part of the bearing and packing device shown in FIG. 13.

In one example of this bearing device as illustrated in FIGS. 13 and 14, there is provided a bearing housing 42 formed integrally with the hull 1 of the underwarer scooter at the stern extremity thereof. This bearing housing is in the form of a hollow cylinder coaxially disposed around the propeller shaft 15 and at its inner end has an internal flange 43 extending inward toward the shaft axis but not contacting the shaft.

The bearing housing 42 accommodates therewithin, in sequence from the internal flange 43 aft toward the stern, a sealing ring 44 of X-shaped or H-shaped cross section, a spacer ring 45 of channel cross section with flanges directed inward toward the shaft axis, another sealing ring 46 similar to the ring 44, a lubricantless ring 47, and a cap 55 covering the stern end of the bearing housing 42 and having an inner sleeve 54 interposed coaxially between the bearing housing and the lubricantless ring 47.

All of the above named parts within the bearing housing 42 are coaxially disposed around the propeller shaft 15, the rings 44 and 46 and the lubricantless ring 47 being in contact with the shaft. An annular space is formed between defined by the shaft 15, the rings 44 and 46, and the ring 45 and contains a lubricating oil 48, which is a grease-like lubricant of the consistency of soft mud and is prevented from leaking out by the rings 44 and 46.

The inner or forward end of the propeller shaft 15 is coupled by a universal joint 51 to the motor shaft 50 of the motor 14.

As described above with respect to one example, the propeller shaft bearing device of this invention is of extremely simple construction and organization. Furthermore, the use of the rings 44 and 46 afford positive prevention of leakage of the lubricating of the oil 48, whereby not only is the consumption of the lubricating oil 48 minimized, but the smooth rotation of the propeller shaft 15 is attained.

Furthermore, since the bearing housing 42 is formed integrally and simultaneously with the hull 1, a great reduction in the manufacturing cost is afforded, and the bearing device can be greatly simplified. Accordingly, in comparison with conventional bearing devices, which are ordinarily assembled aggregates of various parts, the bearing device of this invention has high strength and durability and is highly waterproof with respect to water under pressure.

According to this invention in still another aspect thereof, there is provided a heat-transmitting or cooling device for preventing formation of dew drops due to condensation of moisture within the hull 1 of the underwater scooter. This device comprises, essentially, one or more plates of a metal which is capable of transmitting and releasing heat rapidly from the interior of the hull 1 to the outside water. These plates are disposed in a part of the hull which is in contact with the outside water.

In one example of this dew preventing device as illustrated in FIGS. 1 and 6, a tapped hole 57 is formed in a part of the hull 1 which contacts the outside water, such as the hull bottom or the side wall. The threaded part of a flanged plug plate 58 is screwed into engagement with this tapped hole 57 until the flange of the plug plate 58 bears firmly on an O-ring 59 interposed as a packing between the plate flange and the hull 1.

The plug plate 58 is made of a metal having a high thermal conductivity whereby heat within the hull 1 can be rapidly released to the outside water, and the interior temperature of the hull 1 is caused to approach that of the outside water. The metal plate alternatively can be made in the shape of a plate 58a without a flange or threaded part and fitted in depression formed in the inner surface of the hull 1.

In this manner, deposition of moisture droplets on parts within the hull 1 is prevented. More specifically, the hull interior temperature in summer in a temperate zone is of the order of from 50° to 60°C, while the outside water temperature is of the order of from 10° to 20°C. Consequently, this temperature difference causes moisture to condense and be deposited as dew droplets on parts within the hull. However, one or more of the metal plates 58 or 58a provided in accordance with this invention release the heat within the hull 1 to the outside water thereby to lower the temperature within the hull to a value of the order of from 25° to 30°C and prevent the formation of moisture droplets.

Accordingly, short-circuiting of electrical components and conductors by condensed moisture and corrosion of metal parts due to this moisture are prevented, whereby the serviceable life of the entire underwater scooter is prolonged. Furthermore, impairment or damage due to high temperatures within the hull to various parts, such as softening of the inner regions of the hull is prevented by the lowering of the hull interior temperature by the above described cooling device according to the invention.

For further protection of electrical parts from condensed moistrue within the hull, this invention provides moistureproof housings for installation of electrical components.

Figure 15:
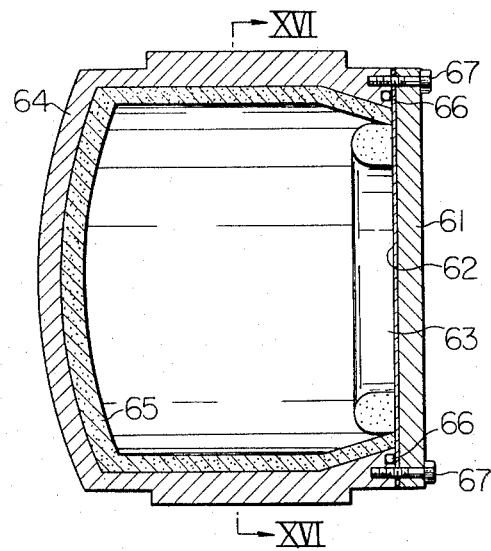
FIG. 15 is a side elevation, in vertical section, showing an example of a moistureppproof housing for electrical devices in the underwater scooter.
Figure 16:
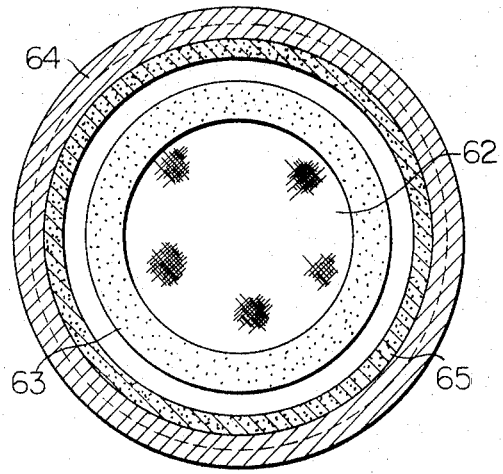
FIG. 16 is a section taken along the plane indicated by line XVI—XVI in FIG. 15 as viewed in the arrow direction.

In one example of these moistureproof housings as illustrated in FIGS. 15 and 16, there is provided a base plate 61 made of a material such as aluminum and secured by screws 67 to and around the rim of the open end of a cylindrical housing structure 64 closed at its other end and made of a hard synthetic resin or aluminum. An O-ring 66 is interposed between the base plate 61 and the housing structure 64 to prevent infiltration of moisture. Thus, the base plate 61 and the housing structure 64 constitute a fully sealed housing.

The inner surface of the base plate 61 is lined with a layer of a moisture-absorbant material 62 such as a cotton fabric, a non-woven fabric, or a paper. The housing structure 64 is lined over its inner surface with a thermal insulation casing 65 made of a material such as a foamed styrol resin. As annular moisture-absorbing ring 63 having a semicircular cross section and made of cotton, a non-woven fibrous material, or the like is secured onto the inner surface of the layer of the moisture-absorbant material 62 by means such as an adhesive.

The moistureproof housing as described above is in its assembled state. Prior to the securing of the housing structure 64 to the base plate 61 as described above, one or more electrical components such as switches and transformers are mounted in insulated state on the inner side of the base plate 61, or a mounting plate (not shown) on which the electrical components have been previously mounted is secured to the inner side of the base plate. The housing structure 64 is then secured by screws 67 to the base plate 61 with the O-ring 66 interposed therebetween.

Thus, the electrical component or components are fully enclosed and protected from moisture droplets within the hull. Any moisture originally existing within the above described moistureproof housing and tending to condense is rapidly absorbed by the moisture-absorbant layer 62 and the moisture-absorbing ring 63. Mosture absorbed by the layer 62 and tending to migrate toward the thermal insulation casing 65 is absorbed by the ring 63 and thereby prevented from reaching the casing 65.

Thus, the electrical components thus housed and protected within the moistureproof housing according to this invention is protected from short-circuiting and corrosion due to condensed moisture or water which has infiltrated into the hull.

Figure 17:
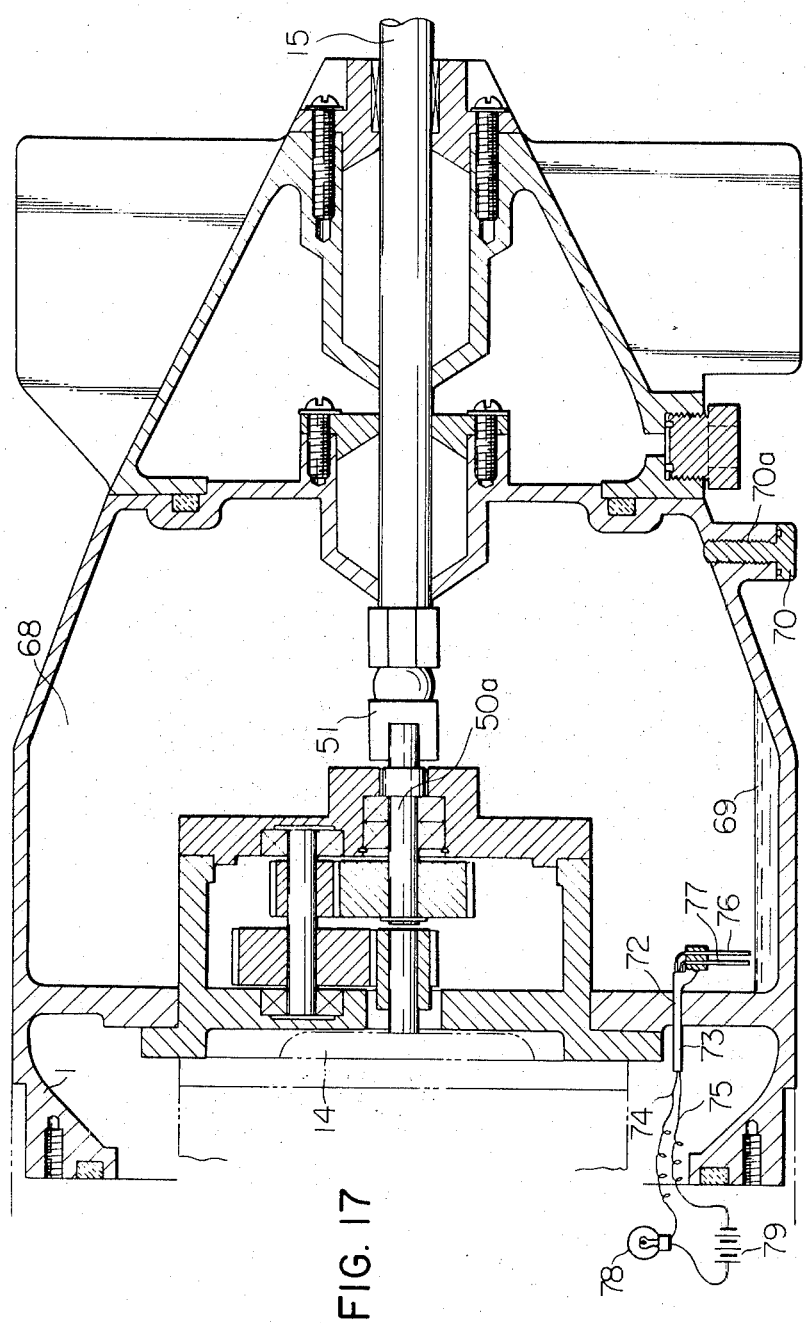
FIG. 17 is a vertical, longitudinal section, partly in schematic form, showing one example of a device for detecting and indicating the presence of water which has infiltrated into the hull.

This invention further provides a device which detects and indicates the presence of water which has infiltrated into a part of the interior of the hull 1 such as a compartment 68 as shown in FIG. 17. In this example, the compartment 68 is disposed between the motor 14 and the stern of the hull 1 and contains a universal joint 51 coupling the output shaft 50a of a speed-reduction device to the propeller shaft 15.

The example illustrated in FIG. 17 of the water detection and indication device of this invention comprises two spaced-apart switch electrode 76 and 77, which are directed downward and have tips which are at a specific height above and relatively near the bottom of the compartment 68, an insulator tube passed through a through hole 72 in a bulkhead partition of the hull 1, an electric power source 79 within the hull, an indicating lamp 78 connected at one terminal thereof to one electrode of the power source 79, and conductor wires 74 and 75 respectively connecting the switch electrode 76 to the other terminal of the lamp 78 and the switch electrode 77 to the other electrode of the power source 79.

When water 69 infiltrates into the compartment 68 and rises to a level such as to cause electrical contact between the switch electrodes 76 and 77, the electrical circuit comprising the above named parts is closed, and power is supplied by the power source 79 to light the indicating lamp 78 thereby to indicate the existence of water 69 of a predetermined quantity. For draining out this water 69, a tapped drain hole 70a is provided in the bottom of the compartment 68 and is normally closed by a screw plug 70.

Figure 18:
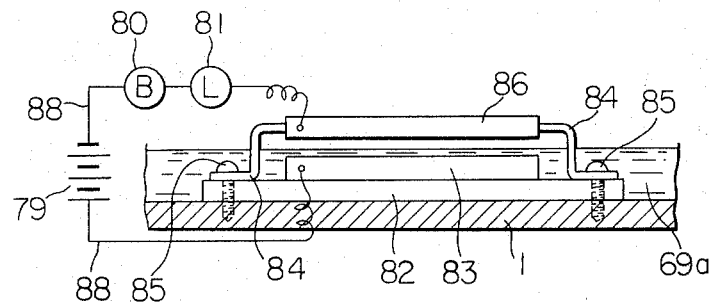
FIG. 18 is a fragmentary vertical section, partly in schematic form, showing another example of a device for detecting and indicating the presence of water in the bottom or bilge of the hull.

In another example of the water indicating device according to this invention as illustrated in FIG. 18, two conductor plates 86 and 83 are disposed parallelly and apart, one above the other. The lower conductor plate 83 is supported directly on an electrically insulating mounting plate 82 secured to the inner surface of the bottom of the hull 1. The upper conductor plate 86 is supported by support members 84, 84 secured to the mounting plate 82 with screws 85, 85.

The conductor plate 86 and 83 constitute electrodes of a liquid switch similar to that of the electrodes 76 and 77 in the preceding example. This switch is a component in an electrical circuit comprising, in addition, a power source 79, a buzzer 80, a pilot lamp 81, and suitable circuit wiring 88. When water 69a infiltrates into the interior of the hull 1 and rises to a level such as to short-circuit the conductor plates 83 and 86, the above mentioned circuit is closed, whereupon the buzzer 80 is activated and emits a warning sound, and the pilot lamp 81 is lit.

The power source 79 for operating the water detecting and indicating devices of the foregoing two examples may be the main storage battery 29 for propelling the underwater scooter or some of the cells of the battery 29, or it may be a separate power source such as another battery.

This invention, in a further aspect thereof, provides several means contributing to the solution of the problems caused by the generation of gases from the storage battery.

In one example of such means as illustrated in FIG. 3, 4, and 5, the storage battery 29 comprises a number of storage cells containing a colloidal electrolyte and communicating at their upper parts to a common discharge manifold 23. The downstream end of this manifold 23 is connected by a flexible pipe 24 to an inlet of the aforementioned accumulating tank 25 containing fibers such absorbent cotton, which functions to absorb moisture contained in gases generated in and discharged from the battery 29.

The accumulating tank 25 has an outlet which is connected by a flexible pipe 26 to an inlet of the aforementioned inflatable container 27, which is made of a material such as rubber and is sealed from the surrounding air. The battery gases are thus conducted into this inflatable container 27 and thus retained. The container 27 has an outlet which is connected to one end of an exhaust pipe 28. The other end of the exhaust pipe 28 is passed through and terminates at a raised structure 20 having a cylindrical, threaded peripheral part 34 and disposed to project upward from the upper middle part of the hull 1.

The outlet of the exhaust pipe is surrounded by a groove in the raised structure 20 to receive an O-ring 33 whereby a gas exhaust outlet 36 is formed at one part of the upper surface of the raised structure 20. At another part of this structure, there are provided three socket devices 35 for receiving prongs of a plug at the end of an electric cord (not shown) for charging the storage battery. These socket devices 35 are surrounded by a groove for receiving an O-ring 32 whereby a charging receptacle 31 is formed.

When the charging receptacle 31 or the gas exhaust outlet 36 is not being used, the entire raised structure 20 is covered by a screw cap cover 30 screwed onto the threaded part 34 of the raised structure. When the cap cover 30 is thus screwed into place, the inner surface of its upper wall bears down on the O-rings 32 and 33, whereby the charging receptacle 31 and the gas exhaust outlet 36 are simultaneously and tightly sealed.

When the storage battery is to be recharged, the cap cover 30 is unscrewed and removed for plugging the plug of charging cord into the charging receptacle 31, whereupon the battery gases stored principally in the inflatable container 27 and accumulating tank 25 is released naturally and automatically into the atmosphere. Accordingly, there is no necessity for providing separate means for exhausting the battery gases. Moreover, since the gas exhaust outlet 36 is opened and the gases exhausted each time the cap cover 30 is opened, there is no risk of excessive accumulation of battery gases due to neglect or forgetfulness.

Another example of means according to this invention for exhausting battery gases will now be described in detail with respect to a modification, as illustrated in FIGS. 23 through 26, of the preceding example of a gas exhausting system.

Figure 23:
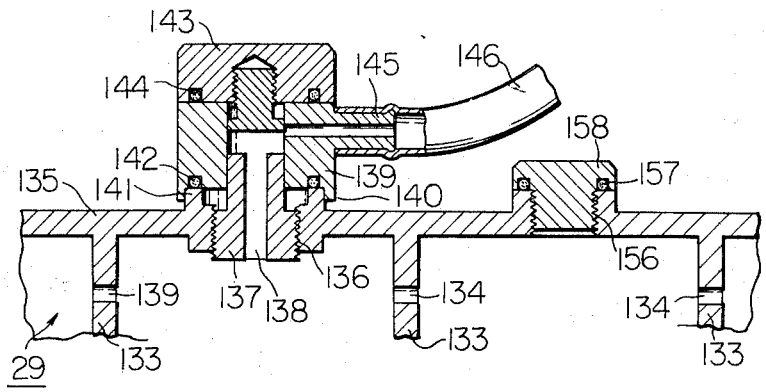
FIG. 23 is an enlarged, fragmentary view, mostly in vertical section, showing a part of another device for exhausting battery gases.

As shown in FIG. 23, the storage battery is enclosed within a battery casing 29, the interior of which is divided into a number of cells by partition walls 133 provided at their upper parts with respective through holes 134, through which battery gases generated in the various cells are collected and led to an exhausting part. A tapped hole 136 is formed in the upper wall 135 of the battery casing 29 for the double purpose of introducing and extracting the battery electrolyte and of discharging the battery gases. A gas discharge plug 137 is screwed at its lower part into this tapped hole 136. This plug 137 has a T-shaped gas discharge hole 138 formed in a shank part thereof extending upward. A swivel fitting 139 is fitted rotatably around the shank part of the plug 137.

A peripheral skirt 140 is formed around the lower part of the swivel fitting 139 and is fitted slidably around an annular projection 141 formed on the upper wall 135 of the battery casing. The bottom surface of the swivel fitting 139 inward from the skirt 140 is seated on the upper surface of the projection 141 with an annular packing 142 interposed therebetween. The swivel fitting 139 is thus held by a cap nut 143 having internal threads engaged with screw threads formed at the upper part of the plug 137, an annular packing 144 being interposed between the cap nut 143 and the swivel fitting 139. Thus, the packings 142 and 144 prevent gas leakage past the sliding surfaces of the swivel fitting 139.

An outlet tube 145 communicating with the above mentioned discharge hole 138 in the plug 137 extends outward from the swivel fitting 139. One end of a flexible exhaust pipe 146 made of a material resistant to acids and alkalis is fitted onto this outlet tube 145, while the other end of the exhaust pipe is connected to an intermediate coupling as illustrated in FIG. 25 or is connected directly to a fitting 149 screwed into the upper wall of the hull 1 and communicating with the exhaust outlet 28 formed in a raised structure 161 as described hereinabove.

The raised structure 161 is provided further with sockets 35a, 35b, and 35c for receiving the prongs of a plug of a battery recharging cord (not shown). These sockets and the exhaust outlet 28 are respectively surrounded by annular packings 32 and 33 and covered by a screw cap cover 30 as described hereinabove.

Figure 25:
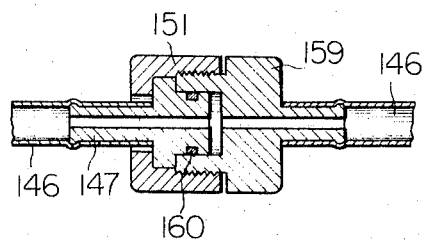
FIG. 25 is a longitudinal section showing an intermediate coupling in the gas exhaust pipe of the device shown in FIGS. 23 and 24.

If necessary, the exhaust pipe 146 may be provided at an intermediate point thereof with a coupling as shown in FIG. 25 and comprising a female member 159 a male member 147 fitted into the female member 159, an annular packing 160 interposed between the male and female members, and a union nut 151 clamping together these members.

Figure 26:
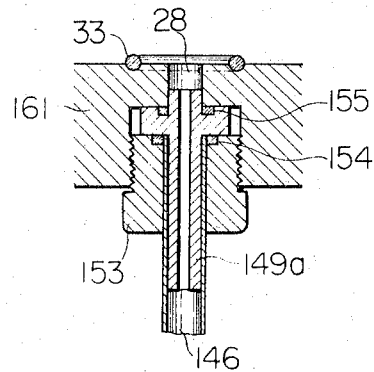
FIG. 26 is a vertical section showing the manner in which the downstream end of the gas exhaust piep is secured to the outlet at the hull.

In the case where the load on the flexible exhaust pipe 146 is large for some reason such as the use of an intermediate coupling as described above, a flanged T-shaped fitting 149a is connected to the outlet end of the exhaust pipe 146 and inserted into a tapped hole bored coaxially with and below the outlet hole 28 in the raised st structure 161 as shown in FIG. 26. The fitting 149a abuts against a ledge formed at the upper end of the tapped hole with an annular packing 155 interposed therebetween and is thus held in place by a screw plug 153 fitted around the fitting 149 and the end of the exhaust pipe 146 and screwed into the tapped hole, an annular packing 154 being interposed between the inner end surface of the plug 153 and the flange of the fitting 149.

Each of the aforementioned cells formed between adjacent partition walls 133 is provided at the center of its upper wall 135 with a tapped hole 156 for introducing and removing the battery electrolyte. Each hole 156 is normally closed by a screw plug cap 158 screwed into the hole with an annular packing 157 interposed therebetween.

The gases generated in the storage battery within the underwater scooter has a tendency to infiltrate into even minute gaps and interstices. Consequently, even when a power distribution chamber separated from the battery compartment is provided, the gases tend to penetrate into the distribution chamber through the interstices between the conductor wires and between the conductor wires and the outer covering of the cable connected to junction terminals to which the battery leads are connected. Consequently, there arises the danger of ignition of these gases and the resulting explosion.

As one measure for overcoming this difficulty, this invention in a further aspect thereof provides conductor wires whereby infiltration of battery gases as described above is prevented.

Figure 19:
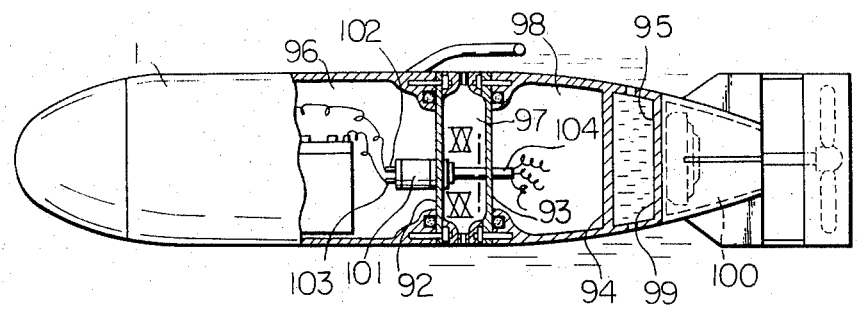
FIG. 19 is a side (port) elevation, which parts cut away, indicating the manner in which a cable of gastight construction is installed in conjunction with a sealed terminal box to prevent infiltration of battery gases into an electrical distribution compartment.
Figure 20:
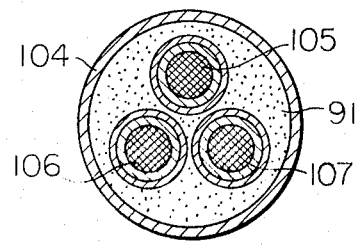
FIG. 20 is an enlarged cross section showing the construction of the above mentioned cable.

One example of this measure will now be described with reference to FIGS. 19 and 20, wherein the underwater scooter has a hull 1 provided with at least four bulkheads 92, 93, 94, and 94, whereby a storage battery compartment 96, a water compartment 97, a power distribution compartment 98, a water compartment 99, and a motor compartment 100 are formed. In the bulkhead 92, there is installed a sealed box 101 provided with a number of junction terminals 102, 103, etc., to which conductor wires 105, 106, and 107 of a cable 104 are connected within the sealed box 101.

In the fabrication of the cable 104 according to this invention, the cable is cut to the required length and placed in an evacuating device to remove air therefrom, and then a filler 91 of the consistency of soft mud made of a material such as vinyl which is resistant to acids and alkalis is introduced under forceful pressure by means such as a sprayer into the interstices between the outer cover of the cable 105 and the conductor wires 105, 106, and 107 and between the conductor wires 105, 106, and 107 thereby to close these interstices against infiltration of gases therethrough.

Thus, while the connections between the terminals and the conductor wires are provided with a primary gas shield in the sealed box 101, which is sealed in a gas-tight manner, the filler 91 affords a secondary gas shield in the interstices between the conductor wires. Accordingly, the battery gases are prevented from entering the power distribution compartment 98, wherein there is then no danger of an explosion even if sparking should occur in the power distribution compartment.

Figure 21:
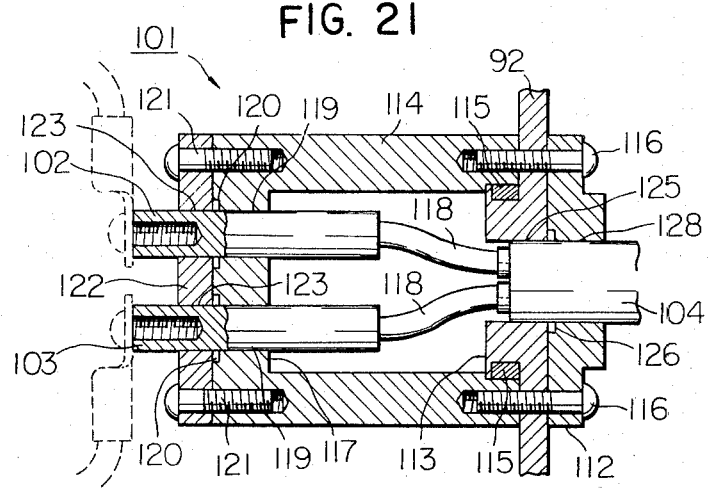
FIG. 21 is a vertical, longitudinal section showing the details of one example of a sealed terminal box used in conjunction with the above mentioned cable.

A specific example of the sealed terminal box 101 and related parts is illustrated in FIG. 21. The principal structure of this box 101 is a hollow cylinder 114 with an end wall 117 closing one end thereof, the other open end of the cylinder abutting against the force surface of the bulkhead 92 over and around a projecting part 113 formed in the bulkhead. A packing 115 is interposed between the cylinder and the projecting part 113. The cylinder 114 is made of a material which is resistant to acids and alkalis. An end plate 112 is disposed against the aft surface of the bulkhead 92 in coaxial alignment with the cylinder 114 and is secured to the bulkhead and the cylinder by screws 116.

Through holes 119 of a number equal to the number of terminals are formed in the end wall 117 of the cylinder 114. A sealing plate 122 is fastened by screws 121 against the outer or fore surface of the end wall 117 with packings 120 disposed therebetween and around the outer rim of the holes 119. The sealing plate 122 is provided with through holes 123 respectively aligned coaxially with the above mentioned holes 119 in the end wall 117. A plurality of terminals, such as terminals 102 and 103, for example, are inserted through and fixed in a gas-tight manner in the holes 123 and 119, whereby gases are prevented from infiltrating into the interior of the cylinder 114.

The aforementioned projecting part 113 of the bulkhead 92 and the end plate 112 are provided at their central parts with coaxially aligned through holes 125 and 128, respectively, in which a cable 104 is inserted and sealed in a gas-tight manner by means such as a packing 126 disposed at the inner rim of the hole 128. The cable 104 contains conductor wires 118, which are connected respectively to the inner ends of the terminals 102 and 103.

It will be apparent that by the above described construction of the sealed box 101, gases generated in the battery and existing in the battery compartment are positively prevented from infiltrating past the sealed box 101 into the aft side of the bulkhead 92. Accordingly, there is no danger of explosion due to these gases and sparking of electrical equipment in the power distribution compartment 98 disposed aft of the bulkhead 92.

Furthermore, infiltration of not only gases but also other fluids such as water and damp air is positively prevented, whereby short-circuiting and corrosion of the terminals 102 and 103 and the connections between these terminals and the conductor wires 118 within the cylinder 114 are positively prevented.

Figure 22:
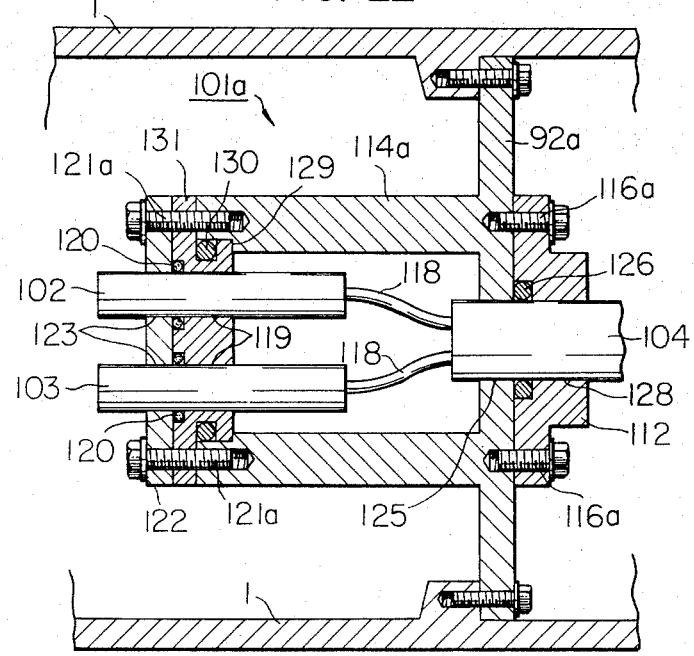
FIG. 22 is a vertical, longitudinal section showing the details of another example of the sealed terminal box.

In a modification of the sealed box, as illustrated in FIG. 22, the cylinder 114a of the sealed box 101a is formed integrally with a bulkhead plate 92a on the forward side thereof, both the cylinder 114a and the bulkhead plate 92a being made of a material resistant to acids and alkalis. The forward open end of the cylinder 114 is provided around the inner rim part thereof with an annular shoulder or counterbored recess 129. A part of a flanged mounting plate 131 having a packing ring 30 in an annular groove formed therearound is fitted into the forward end of the cylinder 114a to abut against the shoulder 129.

A sealing plate 122 is superposed over the mounting plate 131 and secured to the forward end of the cylinder 114 by screws 121a passing through the sealing plate and the mounting plate to engage with the threads of respective tapped holes in the forward end of the cylinder. Thus, the mounting plate 131 corresponds structurally to the end wall 117 in the sealed box 101 previously described with reference to FIG. 21.

In all other respects, this sealed box 101a is similar in constructional and functional features to the preceding example shown in FIG. 21. Accordingly, further description of this sealed box will be omitted.

According to this invention in a further aspect thereof, there are provided a number of means for preventing leakage of the electrolyte from the storage battery cells. Such means are necessary since the underwater scooter is subject to considerable motion, principally rolling, pitching, and yawing.

Figure 27:
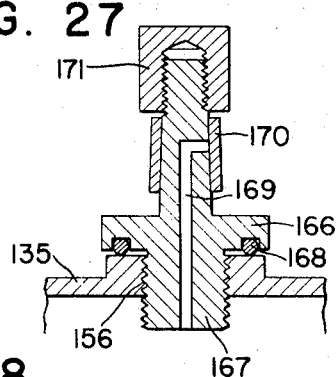
FIG. 27 is a vertical section showing an example of a device which permits the escape of only gases out of a storage battery cell and prevents leakage out of the battery electrolyte.

In one example of such means as illustrated in FIG. 27, a screw plug fitting 167 is screwed into the aforedescribed tapped hole 156 in the center of the upper wall 135 of each cell of the storage battery, an annular packing, e.g., an O-ring, being interposed between the cap flange 166 of the fitting and the cell upper wall 135.

The plug fitting 167 is provided therewithin with a gas discharge hole 169 beginning from an opening at the lower inner end of the fitting, extending through the fitting in the longitudinal direction thereof, and terminating at an opening in the side of the fitting. The opening in the side of the plug fitting 167 is covered by an elastic tube 170 fitted firmly about the fitting. The material and dimensions of the elastic tube 170 are selected so that, while it permits the escape of only the battery gases through the gas discharge hole when the gas pressure within the cell increases to a certain value, it positively prevents leakage of the electrolyte within the cell. The plug fitting 167 is further provided with a threaded upper end, on which is screwed a cap nut 171.

Since the above described plug fitting 167 and the elastic tube 170 permit the battery gases to escape into the atmosphere surrounding the outlet end of the discharge hole 169, the hull 1 at its part forming the ceiling of the battery compartment is provided with a check valve (not shown) for discharging the gases out of the hull in the case where the aforedescribed gas exhaust pipe 28 or 146 and related parts are not used.

Figure 28:
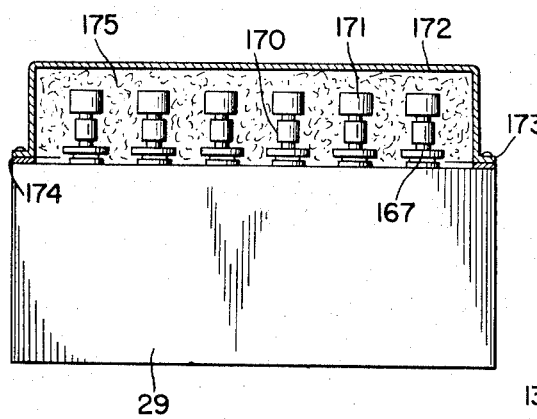
FIG. 28 is a side elevation, with a part cut away, showing devices as shown in FIG. 27 surrounded by a mass of fibrous material which is enclosed within a cover structure.
Figure 29:
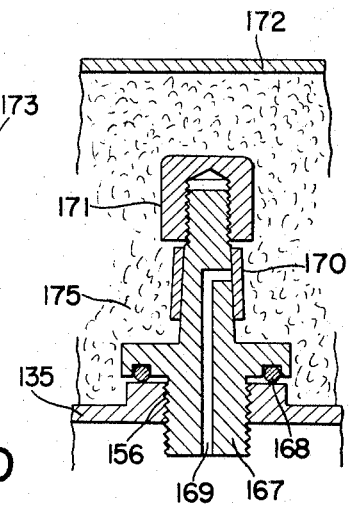
FIG. 29 is an enlarged, fragmentary view, in vertical section showing one of the devices shown in FIG. 28.

All of the above described screw plug fittings 167 and related parts in installed state atop their respective cells can be surrounded completely with a mass of fibrous material 175 as illustrated in FIGS. 28 and 29. This fibrous material 175 is held in place by a cover structure 172 having a peripheral flange 173 and fastened at this flange to the upper edge of the battery case 29 over a gasket 174 interposed therebetween.

While the elastic tube 170 on each fitting 167 normally permits only the battery gases to escape out of the cell and prevents leakage of the electrolyte, the electrolyte may leak out through the gas discharge hole 169 in some cases of violent motion, particularly in the case of capsizing of the underwater scooter. In such a case, the fibrous material 175 functions to absorb the electrolyte thus leaking out of the cells thereby to prevent the electrolyte from escaping out of the battery into the battery compartment.

When supplementary electrolyte is to be added to the battery cells, the cover 172 is removed, and the fibrous material 175 is replaced with a new mass of the fibrous material.

Figure 30:
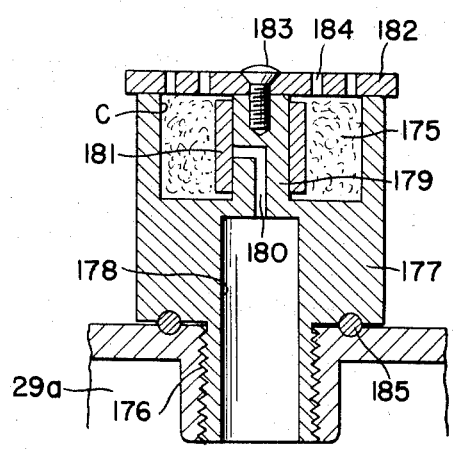
FIGS. 30 and 31 are enlarged vertical sections shown other examples of devices for permitting the escope of gases without leakage of electrolyte out of a battery cell.
Figure 31:
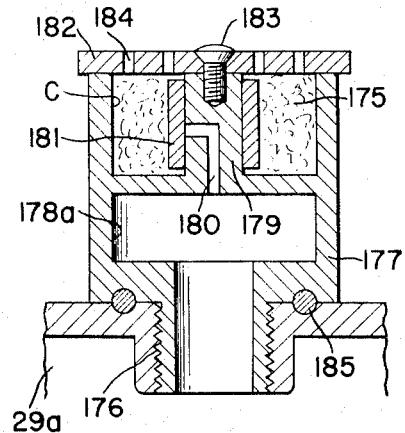
Figure 32:
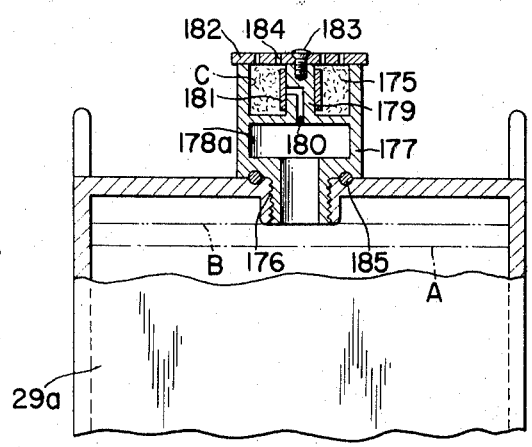
FIG. 32 is an elevation, with parts cut away, indicating the manner in which an additional quantity of the electrolyte can be accommodated.

In still another example of means for preventing leakage of the battery electrolyte as illustrated in FIGS. 30, 31, and 32, each storage cell 29a is provided in its upper wall with a tapped hole 176 for introduction and removal of electrolyte to and from the cell. A screw plug cylinder 177 functioning doubly as a plug stopper and a gas discharge device has a lower threaded tubular part, which is screwed into the tapped hole 176. A packing (e.g., an O-ring) 185 interposed between the cylinder 177 and the upper wall of the cell 29a functions to prevent leakage therebetween.

The plug cylinder 177 is provided therewithin with a supplementary of spare reservoir chamber 178 open at its lower part to the interior of the cell. By the provision of this spare reservoir 178, the upper limit of the level to which the electrolyte can be poured into the cell, which limiting level is ordinarily as indicated by the dot-and-dash line A in FIG. 32, can be raised to a level as indicated by the chain line B. Accordingly, the storage capacity of each cell is correspondingly increased, whereby the cruising time and distance of the underwater scooter with one charging are also increased.

In the upper part of the plug cylinder 177 above the spare reservoir 178, a gas discharge tube 179 having a gas discharge hole 180 formed therethrough is provided. The lower end of the gas discharge hole 180 is open to the reservoir 178, while the upper end thereof is directed horizontally and terminates at an opening at the side of the tube 179. This upper opening of the hole 180 is covered by an elastic tube 181 made of a material such as rubber which can expand outward and fitted firmly around the gas discharge tube 179.

The upper part of the plug cylinder 177 around the gas discharge tube 179 is hollow, whereby an annular chamber C is formed between the tube 179 and the cylindrical wall of the cylinder 177. This chamber C is filled with a fibrous material 175 and then closed with a lid 182 held in place by a screw 183 screwed into a tapped hole at the top of the gas discharge tube 179. The lid 182 is provided therethrough with gas discharge outlets 184.

In a slight modification as shown in FIGS. 31 and 32, the supplementary reservoir 178a is expanded at its upper part to occupy a large space in the plug cylinder 177 below the annular chamber C.

It will be apparent that the device of the above described construction operates on the same principles as the devices of the two preceding examples in addition to the provision of a supplementary reservoir 178 for excessive electrolyte. That is, the elastic tube 181 ordinarily permits only battery gases to be discharged thereby and prevents outward leakage of the battery electrolyte. If, for some reason, the electrolyte happens to escape past the elastic tube 181, it is immediately and effectively absorbed by the fibrous material 175 and thereby prevented from leaking out of the battery parts into the battery compartment.

Figure 33:
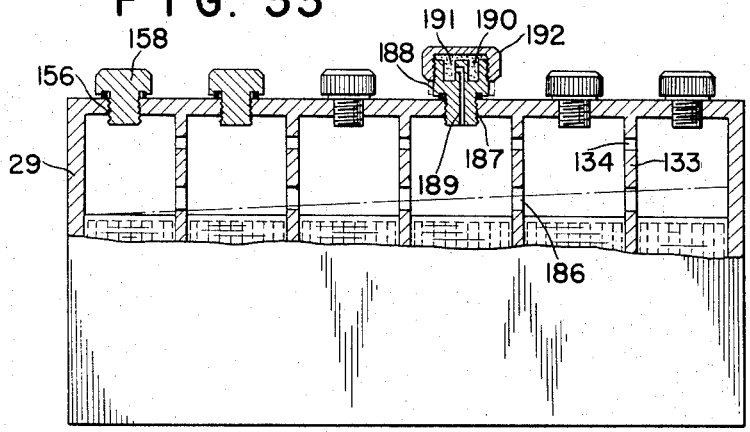
FIGS. 33 and 34 are elevations, with parts cut away, showing a further example of a device for preventing leakage of electrolyte out of battery cells and the provision of through holes in the cell walls for equalization of pressures and electrolyte levels.
Figure 34:
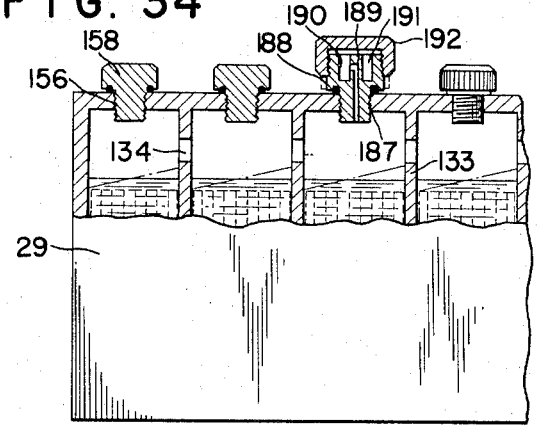

In another of its aspects, this invention provides means for adjusting the battery electrolyte and for collecting and discharging the battery gases, one example of which is illustrated in FIGS. 33 and 34. In this example the storage battery casing 29 is divided into cells by vertical partition walls 133 each provided at its upper part with one or more through holes 134 and at a lower level with one or more additional through holes 186. The provision of these holes in the partition walls prevents deformation of the walls due to unequal pressures of the gases generated in the different cells and permits the gases to collect in a specific region for discharging of these gases.

Similarly as in the preceding examples, a tapped hole 187 is formed in the upper wall of one of the cells. A gas discharge cylinder 188 is screwed at its lower threaded part into this hole 187 with a packing disposed therebetween for gastightness. The gas discharge cylinder 188 has a gas discharge hole 189 formed vertical therethrough from its bottom and through a central tubular part and terminating at an opening in the side of the tubular part, which is surrounded by an annular chamber 190 similar to the chamber C in the examples illustrated in FIGS. 30, 31, and 32. An elastic tubing (not shown) is fitted firmly around the central tubular part over the opening of the gas discharge hole 189 similarly as in the preceding examples.

The annular chamber 190 is filled with a fibrous material 191 consisting of fine fibers of a material such as vinyl acetate having the property of absorbing the battery electrolyte. The cylinder 188 is provided around its upper outer cylindrical surface with screw threads, and a cap nut 192 is screwed thereon over a packing. The cap nut 192 is provided with one or more through holes for exhausting the battery gases.

Figure 24:
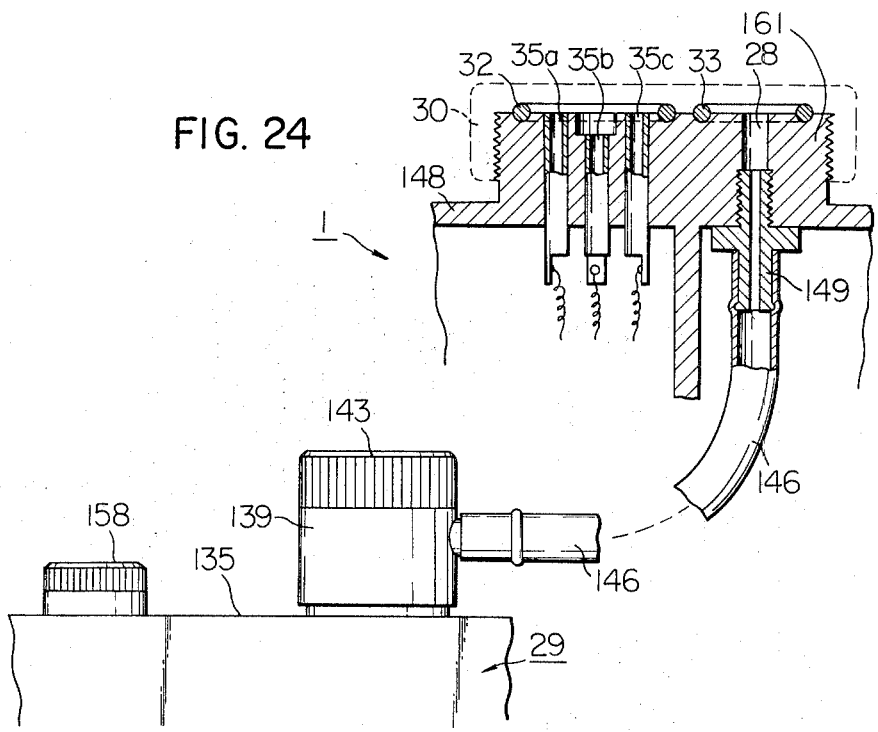
FIG. 24 is a combination of enlarged, fragmentary views, one in side elevation and the other in vertical section, showing the essential parts of the above mentioned device.

Each of the other cells are provided in their upper walls with a tapped hole 156 with a screw plug cap 158 screwed thereinto over a packing, similarly as in the example described hereinbefore with reference to FIGS. 23 and 24, thereby to provide a leakproof access aperture for introducing and removing the electrolyte.

The through holes in the partition walls, particularly the lower holes 186, permit movement of the electrolyte from one cell to another, whereby they afford equalization of the electrolyte levels within all cells and, at the same time, prevent electrode plates in only one or some of the cells from being exposed out of the electrolyte and thereby operating deficiently. Furthermore, when the underwater scooter assumes an angle of inclination, and the electrolyte shifts, the electrolyte returns through the holes 134 to the cells having less electrolyte when the battery case 29 returns to its horizontal state, and the electrolyte levels in all of the cells become substantially uniform, whereby the storage battery can operate normally.

The through holes 134 and 186 also function to equalize the pressures due to generation of gases in all of the cells and thereby to prevent deformation of the partition walls 133 and impairment of the battery performance. Furthermore, the through holes 134 enable the gases generated in different cells to migrate therethrough and collect at one or two gas discharging regions such as the region below the above described gas discharge cylinder 188, whereby there is no necessity of installing a gas discharging device at the upper parts of all of the cells.

In a further aspect thereof, this invention provides a novel and advanced motor of printed-coil type which is highly suitable for use in driving the screw of the underwater scooter of the invention.

In one example of this motor as illustrated in FIGS. 38(a), 38(b), and 39, the various parts of the motor are supported on a motor frame structure comprising a main frame 231 of disk shape and a cover 237 of the shape of a shallow circular pan secured thereto. At the central part of this frame structure, there are provided ball bearings 233 and 240, which rotatably support a rotor shaft 232 extending aftward (i.e., to the right as viewed in FIG. 39) from the main frame 231 and perpendicularly thereto, through the cover 237, and through a bearing support 239 supporting the ball bearing 240 and secured to the outer side of the cover.

The rotor shaft 232 supports a rotor disk 234 made of copper and held fixedly on the shaft by hub plates 235 clamping the rotor disk therebetween and fixed to the rotor shaft. On the forward side (i.e., the left side as viewed in FIG. 39) of the rotor disk 234 in spaced-apart, confronting relation to the outer peripheral region of the rotor disk, there is provided an annular yoke 236 made of iron and secured by screws to the main frame 231.

On the opposite side of the rotor disk 234 in spaced-apart, confronting relation to the outer peripheral region thereof, there is provided an annular permanent magnet 238 secured to the inner side of the cover 237.

The cover 237 has a central through hole through which the inner part of the bearing support 239 projects slightly inward. The outer periphery of the cover 237 is secured and sealed tightly to the main frame 231 to prevent infiltration of water into the interior of the motor frame structure. A cylinder 241 is provided at a suitable position on the inner side of the cover 237. Into this cylinder 241, a pressing spring 242 and a brush 243 are successively inserted thereby to cause the brush 243 to be continually in contact against the rotor disk 234.

The rotation of the rotor shaft 232 is reduced in speed before transmission to the screw by a speed-reduction gear mechanism comprising, for example, a first pinion fixed by a key to the rotor shaft 232, a first large gear meshed with this pinion and fixed to a counter shaft, a second pinion fixed to this counter shaft and meshed with a second large gear fixed to an output shaft coupled to the propeller shaft 15. An example of such a speed-reduction gear mechanism is illustrated in FIG. 17.

The main frame 231, the cover 237, the rotor disk 234, the yoke 236, and the permanent magnet are all designed to have minimal thicknesses in the axial direction, whereby the entire motor can be made to have a small thickness dimension. Accordingly, the heat-discharging effect is excellent. Furthermore, since the cover 237 is secured to the main frame 231 in a watertight manner, the motor can be installed in a compartment which is flooded during operation thereby to cool the motor and provide assurance against overheating thereof.

Figure 40:
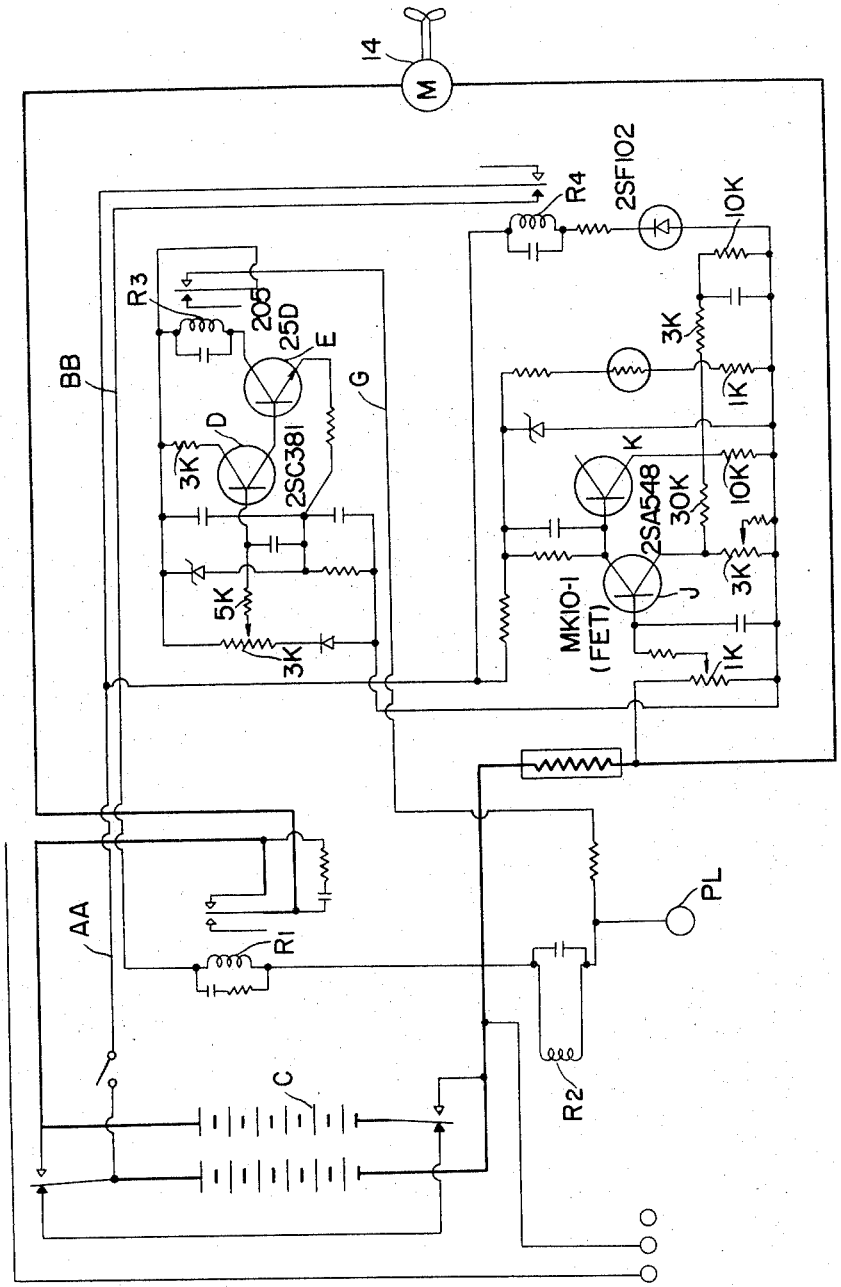
FIG. 40 is a circuit diagram showing one example of an electrical system for controlling overcurrent in the motor of the underwater scooter.

According to this invention in a further aspect thereof, there is provided a novel and advanced device for control of excess current, or overcurrent, in the motor of the underwater scooter. This device is comprises an electrical system of an organization as illustrated by one example in FIG. 40.

In the electric system, when a switch 251 is closed, an electric circuit is formed through a line AA, a white contact 3, another line BB, and a main relay coil $R_1$, back to a power source 252a, whereby another power-source battery 252b is connected in series with the power-source battery 252a to a driving motor M which drives the screw propeller of this device. Thus, the motor M is driven at 24V to a speed corresponding to 3 knots per hour.

In the case where the voltage of the power source thus series connected drops for any reason to a value lower than 20V, the two groups of batteries 252a and 252b are returned to the original condition of being connected in parallel for preventing overdischarge of these batteries. This can be accomplished by selecting a current by means of a variable resistor 3K, amplifying it through transistors D, E, thus exciting a relay coil $R_3$, closing a circuit G and igniting a lump PL, whereupon a relay coil $R_2$ is simultaneously excited, thus closing a white contact for the battery 252b.

When the two groups of batteries 252a and 252b are connected in parallel, the cruising speed of the underwater scooter is decreased to 1.5 knots, and the cruising period thereof can be elongated.

Furthermore, in the case where seaweed or some other matter becomes entangled with the screw which is coupled to the motor M through a speed-reduction mechanism, the motor M will be overloaded. To prevent the occurrence of such an overload condition, the current of the motor M is detected across a shunt, the amount thus detected being amplified through transistors J, K, thus operating a relay $R_4$ to interrupt a current flowing through the main relay $R_1$. The interruption of the energization of the main relay $R_1$ causes the circuit of the power source 252b to be opened, and the motor M is thereby stopped. The motor M is of course operated again after the obstructing seaweeds have been removed from the screw.

As is apparent from the above description, the cruising period of the underwater scooter provided with the control device for controlling the excess current and the power source voltage can be substantially elongated because of the logical operation and economical utilization of the power source current, whereby the possibility of power failure can be minimized.

Generally speaking, the power consumption at the time of discharge of batteries, on the basis of a short-time rating thereof, can be improved by changing the connection of the batteries. In the case where lead oxide batteries of 20-hour discharge rate or alkali batteries of 5-to 10-hour discharge rate are discharged in one hour, only two thirds of the rated capacity of these batteries can be utilized, and it is desired that more than 95 percent of the rated capacity be utilized for propelling the underwater scooter, it is found that the optimum procedure is to first connect the batteries in series, and then to change their connection to parallel.

In other words, an underwater scooter which can operate at a speed of 4 or 5 kilometers per hour when the batteries are connected in series, is operated at a speed of 2.3 or 2.5 kilometers per hour under parallel connection of these batteries, wherby maximum utilizarion of the remainder of the capacity of the batteries can be effected.

Figure 35:
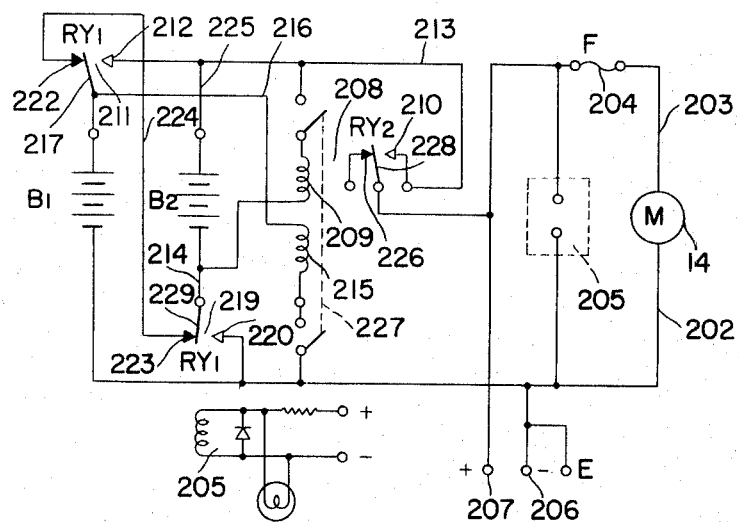
FIG. 35 is a circuit diagram showing the essential organization of a device for switching the motor power source for efficient operation and for preventing excessive discharging of the power source.
Figure 36:
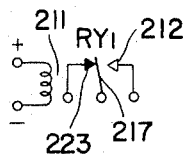
FIG. 36 and the part of FIG. 37 shown by full lines are partial circuit diagrams indicating a magnetic relay in the state for serial connection of storage batteries.
Figure 37:
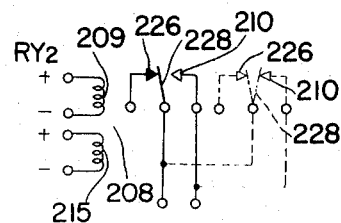
FIG. 37 in the part thereof shown by intermittent lines is a partial circuit diagram indicating the realy in the state of parallel connection of the batteries.

Referring to FIGS. 35 through 37, there is indicated a voltage-drop detecting device 205 connected across the positive and negative leads 202 and 203 of a propelling motor 14. The leads 202 and 203 are further connected to charging terminals 206 and 207, respectively, and the lead 203 is simultaneously connected to an electromagnetic relay 208. That is, the lead 203 is connected to a moving contact 228 of the relay 208, and one end of the relay coil 209 of the relay 208 is connected to a lead 213 which is connected to a contact 210 of the relay 208 and to a contact 212 of another relay 211. The other end of the relay coil 209 is connected to a lead 214 further connected to a power source $B_2$. One end of a relay coil 215 is connected through a lead 216 to a movable contact 217 of the electromagnetic relay 211, and the other end of the relay coil 215 is connected through leads 218 and 202 to a contact 220 of a relay 219 also to another power source $B_1$. The other terminal of the power source $B_1$ is connected to the movable contact 217.

The electromagnetic relays 211 and 219 have respective contacts 222 and 225 connected together via a lead 224. Furthermore, the other terminal 225 of the power-source battery $B_2$ is connected to the lead 213. In the relay 208, another contact 226 is provided in opposed position relative to the contact 210, and furthermore, a composite switch 227 is provided in the circuit of the realy coils 209 and 215. The relay 219 has a moving contact 229.

In the operation off this device, the composite switch 227 is first closed manually. The contacts 222 and 223 are thereby closed, and the relay coils 209 and 219 are thereby energized by currents flowing from the power source $B_1$ and $B_2$, respectively. As a result, the contact 228 is thrown to the side of the contact 226, and the power source $B_1$ and $B_2$ are connected in series with the motor 14. That is, the one side of the power source $B_1$ is connected to the lead 202, and the other side of the power source $B_1$ is connected through a contact 222, lead 224, a contact 223, a lead 214, to the power source $B_2$, and then through a lead 225, lead 213, a contact 226, a movable contact 228, a lead 203, and to the motor 14, sequentially.

Assuming that the initial voltage of the power sources $B_1$ and $B_2$ connected in series is 26 volts, the voltage is soon lowered after the power sources are connected in series with the motor 14. The voltage thus decreased is detected by the voltage-drop detecting device 205, whereupon the electromagnetic relay 208 is deenergized. As a result, the composite switch 227 is opened, and the movable contacts 217, 228, and 229 are disconnected from the contacts 222, 223, and 226, respectively, and are brought into contact with the contacts 210, 212, and 220.

Thus, the power source $B_1$ and $B_2$ are connected in parallel with the motor 14. That is, one side of the power source $B_1$ is connected through a movable contact 217, a contact 212, to the lead 213, and the other side of the power source $B_1$ is connected through the lead 202 to the other terminal of the motor 14.

Likewise, one side of the power source $B_2$ is connected through the movable contact 229 and a contact 220, to the lead 202, and the other side of the power source $B_2$ is connected, via a lead 225, in parallel with the lead 213, which are further connected through the contacts 210, 228, leads 230, 203 to the motor 14.

With the above described connection, the remainder capacity of the power source batteries $B_1$ and $B_2$, which cannot be fully utilized in the state of the series connection, can be utilized by connecting those batteries in parallel, whereby nearly 95 percent of the total capacities of the power source batteries can be utilized.

As a result, the cruisable period of the underwater scooter can be lengthened, and the activity of the scooter can be greatly extended. The composite switch 227 may also be operated manually so that the power source batteries $B_1$ and $B_2$ are connected in parallel, and speed control of the motor 14 or a further economized use of the batteries can be thereby atained.

I claim:

1. An underwater craft for transporting one or more divers underwater, comprising, in combination, a hull having upper and lower parts as well as inner and outer surfaces, a screw for propulsion of said hull, an electric motor for driving said screw through a propeller shaft, having a motor circuit, a storage battery with a plurality of cells for supplying electric power to said motor, including a power-source circuit and a system for controlling the supply of power; a handlebar secured to the exterior of said hull for grasping by at least one diver; a trimming device for diverting water flow past said hull, thereby to trim said hull in pitch to overcome unbalance due to the weight of the diver bearing on said hull; a propeller-shaft bearing for minimizing leakage of outside water into said hull; a device for reducing condensation of moisture in said hull; a device for protecting electrical parts from the moisture and from gases; a device for detecting and indicating water in said hull; a device for discharging battery gases out of said hull; devices for preventing infiltration of the battery gases to and into said electrical parts; a device for preventing leakage of battery electrolyte to parts surrounding said battery; and a device for preventing excess current or overcurrent in said motor; in which said motor is a waterproof printed-coil motor of small dimension in the axial direction; said hull is provided with vertical and tail fins and a ring or cowling disposed around said screw and fixed to said tail fins, and said trimming device includes a horizontal trimming hydroplane hinged at its leading edge to said ring to be pivotable about a horizontal hinge axis, and a mechanism for adjustably setting the angle of attack or trim relative to the screw axis.

2. The underwater craft as defined in claim 1, in which said propeller-shaft bearing includes a cylindrical bearing housing formed integrally with said hull at the stern extremity thereof and disposed coaxially about said propeller shaft, two spaced-apart sealing rings of X-shaped cross section disposed around and in contact with said shaft and contained within said housing, a spacer ring of channel cross section with flanges directed inward toward said shaft, said spacer ring being interposed between said sealing rings and disposed coaxially around said shaft with an annular space therebetween, adapted to receive a grease-like lubricant, a lubricant-less ring disposed coaxially about said shaft aft of the aftmost one of said sealing rings, and a cap ring secured to the aft extremity of said hull and disposed around said shaft to hold said lubricant-less ring in place.

3. The underwater craft as defined in claim 1, in which said device for reducing condensation includes, essentially, at least one plate of a metal capable of transmitting and releasing heat rapidly from the interior of said hull to the outside water, said at least one plate constituting a part of said outer surface of the hull and thereby directly contacting the outside water during operation or being disposed in contact with said inner surface of the hull at a part thereof where said outer surface of the hull is in contact with the outside water during operation.

4. The underwater craft as defined in claim 1, in which said device for discharging battery gases includes a gas discharge manifold for collecting the gases from said battery cells, an accumulating tank adapted to contain an absorbent material and receiving the gas thus collected to remove the moisture therefrom, an elastic inflatable container for temporary retention of the gas thus rid of moisture, a gas exhaust pipe connected at one end to said container, a gas exhaust outlet provided through said upper part of the hull to the outside thereof and connected to the other end of said exhaust pipe, and a detachable, watertight cover for the outer side of said exhaust outlet, said cover being adapted to cover also and simultaneously an electrical receptacle provided on said outside of the hull for insertion thereinto of prongs of a plug of an external conductor cord for recharging said battery.

5. The underwater craft as defined in claim 1, in which said device for discharging battery gases includes partition walls dividing the interior of said battery into said cells thereof and having through holes at the upper parts thereof to permit the battery gases to collect in said upper part of at least one cell, a discharge fitting installed in an upper wall of said one cell for conducting the battery gases out of said battery, a gas exhaust pipe connected at one end to said fitting, a gas exhaust outlet provided through said upper part of the hull to the outside thereof and connected to the other end of said gas exhaust outlet, and a detachable, watertight cover for the outer side of said exhaust outlet, said cover being adapted to cover also and simultaneously an electrical receptacle provided on said outside of the hull for insertion thereinto of prongs of a plug of an external conductor cord for recharging said battery.

6. The underwater craft as defined in claim 5, in which said fitting includes a gas discharge plug screwed at its lower part into a tapped hole in said upper wall of the one cell and extending upward from said upper wall, said plug having a gas discharge hole formed therethrough, a swivel fitting fitted rotatably around said plug and having a passage communicating at one end with said discharge hole and extending at the other end to an opening at the outer extremity of an outlet tube for connection to said exhaust pipe, a cap nut screwed onto the upper part of said plug to hold said swivel fitting down against said upper wall of the one cell, and annular packings interposed respectively between said cap nut and said swivel fitting, as well as between the latter and said upper wall.

7. The underwater craft as defined in claim 1, in which said battery is installed in a battery compartment separated from a power distribution compartment by at least one bulkhead, and the electric power is conducted from said battery to said distribution compartment by way of a sealed terminal box and a cable passed through said at least one bulkhead, said cable including a plurality of insulated conductor wires in substantially parallel, spaced-apart disposition, an outer cable cover encompassing said wires and spaced apart therefrom, and a filler of a material resistant to acids and alkalis, and of a consistency of soft mud, filling the spaces between said cover and said wires, and between said wires themselves.

8. The underwater craft as defined in claim 7, in which said terminal box includes a hollow cylinder having ends closed in a gas-tight manner respectively by first and second end walls, said second end wall being secured to said at least one bulkhead, partly defining said battery compartment, a through hole being formed through said second end wall and said bulkhead for insertion therethrough and into said cylinder of one end of said cable, a plurality of terminal structures inserted through holes in said first end wall to project into the hollow interior of said cylinder and connected respectively at the parts thereof thus inserted to the ends of said conductor wires of the cable thus inserted into said cylinder, the outer parts of said terminal structures being adapted to be connected to respective lead wires to electrodes of said battery, packings interposed between said terminal structures and said first end wall to prevent infiltration of gases and moisture into the interior of said cylinder, and a packing interposed between said cable and said second end wall.

9. The underwater craft as defined in claim 8, in which said cylinder is formed integrally with said at least one bulkhead.

10. The underwater craft as defined in claim 1, in which said device for preventing leakage includes a screw plug fitting having threaded upper and lower parts, the latter being screwed into a tapped through hole in an upper wall of each of said battery cells, said plug fitting having an upper shank part, a through passage hole from the bottom surface of said lower part to an outlet port in a side flank of said shank part, and a flange adjacent said lower part, an elastic tube fitted firmly around said shank part over said outlet port and operative to permit only the battery gases to escape through said outlet port and to prevent leakage of the battery electrolyte out of said cells, a packing interposed between said flange and said upper walls of said cells, and a cap nut screwed onto said upper part of the plug fitting.

11. The underwater craft as claimed in claim 10, in which parts of said device for preventing leakage, above said cells, are surrounded by a mass of an absorbent, fibrous material enclosed within a cover structure fastened in a sealed manner to an upper peripheral part of said battery, whereby any electrolyte which has leaked out of said upper part of the battery is absorbed by said fibrous material and prevented from reaching parts surrounding said battery.

12. The underwater craft as claimed in claim 1, in which said device for preventing leakage includes, with respect to each of said battery cells: a screw plug cylinder having threaded upper and lower plug parts, the latter being screwed into a tapped through hole in an upper wall of said cells, said plug cylinder having a supplementary reservoir chamber open at its lower part to the interior of said cells and having a substantial volume for accommodating excess electrolyte which may rise thereinto, said plug cylinder further having a vertical gas discharge tube disposed above said chamber and having a through passage hole from said chamber to an outlet port in the side of said discharge tube and an annular chamber formed between said discharge tube and a cylindrical outer wall of said plug cylinder, and separated from said reservoir chamber; a mass of an absorbent, fibrous material filling said annular chamber; an elastic tube fitted firmly around said discharge tube over said outlet port and operative to permit only the battery gases to escape and to suppress leakage of the battery electrolyte; a lid having a plurality of vent holes therethrough and secured to said upper plug part of the plug cylinder to close said annular chamber; and a packing interposed between said plug cylinder and said upper walls of the cells.

13. The underwater craft as claimed in claim 1, in which the interior of said battery is divided into said cells by partition walls having through holes at least two levels thereof for continual equalization of pressures and electrolyte levels within said cells, and in which said device for preventing leakage includes, with respect to at least one of said cells: a gases discharge cylinder having an upper part and a lower threaded part, the latter being screwed into a tapped through hole in an upper wall of said one cell, said cylinder further having a gas discharge tube having a through passage hole from the bottom of said lower threaded part to an outlet port in the side of said discharge tube, an annular chamber formed between said discharge tube and cylindrical walls of said cylinder; an absorbent, fibrous material filling said annular chamber; a cap nut having vent holes and being screwed onto said upper part of the cylinder to cover said annular chamber; and a packing interposed between said cylinder and said upper wall of the one cell.

14. The underwater craft as claimed in claim 1, in which said motor includes a main frame for mounting of said motor; a cover having the shape of a shallow pan and secured in a water-tight manner to said frame to form an enclosed and sealed interior; a bearing support secured to the outer central part of said cover and having a central part projecting slightly into said interior through a hole in said cover; coaxial bearings supported respectively by said frame and said support; a rotor shaft rotatably supported in said bearings and supporting coaxially a rotor disk secured perpendicularly to said shaft; an annular yoke made of iron and secured to said frame to confront a peripheral region of said disk on one side thereof; an annular permanent magnet secured to said cover to confront said peripheral region on the other side thereof; brushes contacting said disk; and elastic members urging said brushes into continual contact with said disk.

15. The underwater craft as defined in claim 1, in which excess current in said motor is prevented by an overcurrent controller including a device for changing over the connection of said batteries in accordance with the motor current, and an over-current tripping device which cuts out said batteries when the motor current exceeds a predetermined value.

16. The underwater craft as defined in claim 1, in which said controlling system includes a device for changing over the connection of said batteries, and a device for tripping said power-source circuit, wherein said changing-over device includes a voltage-drop detector inserted in said motor circuit, an electromagnetic relay connected to said detector, and a switching device operated by said relay to change over said connection from series to parallel when the motor current exceeds a predetermined value.

17. The underwater craft as defined in claim 1, in which said device for detecting water includes two switch electrodes supported in spaced-apart, vertical disposition with downwardly directed tips at a predetermined height above the bottom of said hull, an electric power source with two output terminals, and an indicating lamp connected between one of said terminals and one of said electrodes, the other terminal being connected to the other electrode, electrical contact being established between said tips of the electrodes when water in said bottom of the hull rises to the predetermined height to fill the space therein, whereby said lamp is lit.

18. The underwater craft as defined in claim 1, in which said device for detecting water includes first and second conductor plates supported horizontally in mutually parallel and spaced-apart disposition near the bottom of said hull at a specific height thereabove, said plates being electrically insulated from each other and from other parts, an electric power source with two output terminals, a buzzer, and a pilot lamp, one of said terminals being connected to said second plate, and said buzzer and said lamp being connected in series between the other terminal and said first plate, electrical contact being established between said plates when water in said bottom of the hull rises to the specific height to fill the space therein, whereby said buzzer is sounded and said lamp is lit.

* * * * *